(12) United States Patent
Pas

(10) Patent No.: US 7,352,074 B1
(45) Date of Patent: Apr. 1, 2008

(54) SYSTEM FOR PRODUCING HYDROGEN MAKING USE OF A STREAM OF WATER

(76) Inventor: Peter Alexander Josephus Pas, Landweg 4, NL-7044 AN Lengel (NL)

( * ) Notice: Subject to any disclaimer, the term of this patent is extended or adjusted under 35 U.S.C. 154(b) by 968 days.

(21) Appl. No.: 10/129,600

(22) PCT Filed: Nov. 13, 2000

(86) PCT No.: PCT/NL00/00828

§ 371 (c)(1),
(2), (4) Date: May 29, 2002

(87) PCT Pub. No.: WO01/34973

PCT Pub. Date: May 17, 2001

(30) Foreign Application Priority Data

Nov. 11, 1999 (NL) .................................. 1013559

(51) Int. Cl.
*F03B 13/00* (2006.01)
*F03B 13/10* (2006.01)
*H02P 9/04* (2006.01)
(52) U.S. Cl. .......................................... 290/43; 290/54
(58) Field of Classification Search .................. 290/43, 290/54
See application file for complete search history.

(56) References Cited

U.S. PATENT DOCUMENTS

| | | | |
|---|---|---|---|
| 1,971,102 A * | 8/1934 | Barraja-Frauenfelder et al. ........................... | 114/333 |
| 2,563,279 A * | 8/1951 | Rushing ...................... | 415/4.3 |
| 3,157,145 A * | 11/1964 | Farris et al. ................. | 114/332 |
| 3,906,572 A * | 9/1975 | Winn ............................ | 15/1.7 |
| 3,952,349 A * | 4/1976 | Erath et al. .................. | 114/331 |
| 4,011,827 A * | 3/1977 | Fond ........................... | 114/222 |
| 4,026,587 A * | 5/1977 | Hultman et al. .............. | 290/53 |
| 4,039,848 A * | 8/1977 | Winderl ....................... | 290/55 |
| 4,041,565 A * | 8/1977 | Hatley ......................... | 15/200 |
| 4,075,313 A * | 2/1978 | Pangborn et al. ............ | 423/658 |
| 4,163,904 A * | 8/1979 | Skendrovic .................. | 290/54 |

(Continued)

FOREIGN PATENT DOCUMENTS

DE 4125691 2/1993

(Continued)

OTHER PUBLICATIONS

PCT/NL00/00828 Copy of International Search Report dated Feb. 28, 2001.

*Primary Examiner*—Julio Gonzalez
*Assistant Examiner*—Pedro J. Cuevas
(74) *Attorney, Agent, or Firm*—Kirkpatrick & Lockhart Preston Gates Ellis LLP

(57) ABSTRACT

A system for producing hydrogen from water, making use of a stream of water such as a gulf stream or tidal stream, includes a number of submerged modules, each having a turbine that can be driven by the stream of water. The turbine is coupled to a generator for generating electrical energy. Each module may have submerged decomposition means for decomposing water into hydrogen and oxygen using the electrical energy generated. The modules are provided with means to control the depth of the modules below water level, and furthermore with means for automatically orienting the front of the modules—viewed in the longitudinal direction of the turbines—to the direction of flow of the water or an angular position deviating therefrom.

21 Claims, 3 Drawing Sheets

U.S. PATENT DOCUMENTS

| | | | | |
|---|---|---|---|---|
| 4,168,557 A * | 9/1979 | Rasch et al. | | 15/1.7 |
| 4,270,484 A * | 6/1981 | Shimatani et al. | | 118/305 |
| 4,335,093 A * | 6/1982 | Salomon | | 423/644 |
| 4,383,132 A * | 5/1983 | Bentvelsen et al. | | 174/120 SC |
| 4,392,063 A * | 7/1983 | Lindquist | | 290/54 |
| 4,490,232 A * | 12/1984 | Lapeyre | | 204/278 |
| 4,524,285 A * | 6/1985 | Rauch | | 290/43 |
| 4,574,722 A * | 3/1986 | Orita et al. | | 114/222 |
| 4,598,436 A * | 7/1986 | Regnet et al. | | 15/21.1 |
| 4,613,279 A * | 9/1986 | Corren et al. | | 415/121.2 |
| 4,700,784 A * | 10/1987 | Wiebe et al. | | 172/126 |
| 4,816,697 A * | 3/1989 | Nalbandyan et al. | | 290/54 |
| 4,826,465 A * | 5/1989 | Fleischmann | | 446/162 |
| 4,838,193 A * | 6/1989 | van der Tak | | 114/222 |
| 4,850,190 A | 7/1989 | Pitts | | 60/398 |
| 4,868,408 A | 9/1989 | Hesh | | 290/52 |
| 4,919,637 A * | 4/1990 | Fleischmann | | 446/162 |
| 5,100,290 A * | 3/1992 | Berger | | 415/60 |
| 5,222,452 A * | 6/1993 | Maloney et al. | | 114/222 |
| 5,440,176 A | 8/1995 | Haining | | 290/54 |
| 5,454,129 A * | 10/1995 | Kell | | 15/1.7 |
| 5,506,453 A * | 4/1996 | McCombs | | 290/44 |
| 5,512,787 A | 4/1996 | Dederick | | 290/4 R |
| 5,513,930 A * | 5/1996 | Eathorne | | 114/222 |
| 5,617,600 A * | 4/1997 | Frattini | | 15/1.7 |
| 5,798,572 A * | 8/1998 | Lehoczky | | 290/54 |
| 6,070,547 A * | 6/2000 | Achord | | 114/222 |
| 6,091,161 A * | 7/2000 | Dehlsen et al. | | 290/43 |
| 6,104,097 A * | 8/2000 | Lehoczky | | 290/54 |
| 6,276,478 B1 * | 8/2001 | Hopkins et al. | | 180/164 |
| 6,278,197 B1 * | 8/2001 | Appa | | 290/55 |
| 6,492,743 B1 * | 12/2002 | Appa | | 290/55 |
| 6,504,260 B1 * | 1/2003 | Debleser | | 290/44 |
| 6,531,788 B2 * | 3/2003 | Robson | | 290/43 |
| 6,588,352 B2 * | 7/2003 | Kay | | 114/61.12 |
| 6,688,105 B1 * | 2/2004 | Shick | | 60/641.1 |
| 6,756,695 B2 * | 6/2004 | Hibbs et al. | | 290/42 |
| 6,841,893 B2 * | 1/2005 | Maiwald et al. | | 290/43 |
| 6,864,596 B2 * | 3/2005 | Maiwald et al. | | 290/54 |
| 6,911,126 B1 * | 6/2005 | Slavchev | | 204/266 |
| 6,952,058 B2 * | 10/2005 | McCoin | | 290/44 |
| 6,982,498 B2 * | 1/2006 | Tharp | | 290/54 |
| 6,995,479 B2 * | 2/2006 | Tharp | | 290/54 |
| 6,998,730 B2 * | 2/2006 | Tharp | | 290/54 |
| 7,042,114 B2 * | 5/2006 | Tharp | | 290/54 |
| 7,291,936 B1 * | 11/2007 | Robson | | 290/43 |
| 2002/0152941 A1 * | 10/2002 | Kay | | 114/61.16 |
| 2004/0066043 A1 * | 4/2004 | Maiwald et al. | | 290/43 |
| 2004/0072040 A1 * | 4/2004 | Duffy et al. | | 429/21 |
| 2004/0133999 A1 * | 7/2004 | Walton | | 15/1.7 |
| 2004/0220701 A1 * | 11/2004 | Maiwald et al. | | 700/287 |
| 2006/0162642 A1 * | 7/2006 | Morse | | 114/382 |

FOREIGN PATENT DOCUMENTS

| | | |
|---|---|---|
| WO | WO 8100595 | 3/1981 |

* cited by examiner

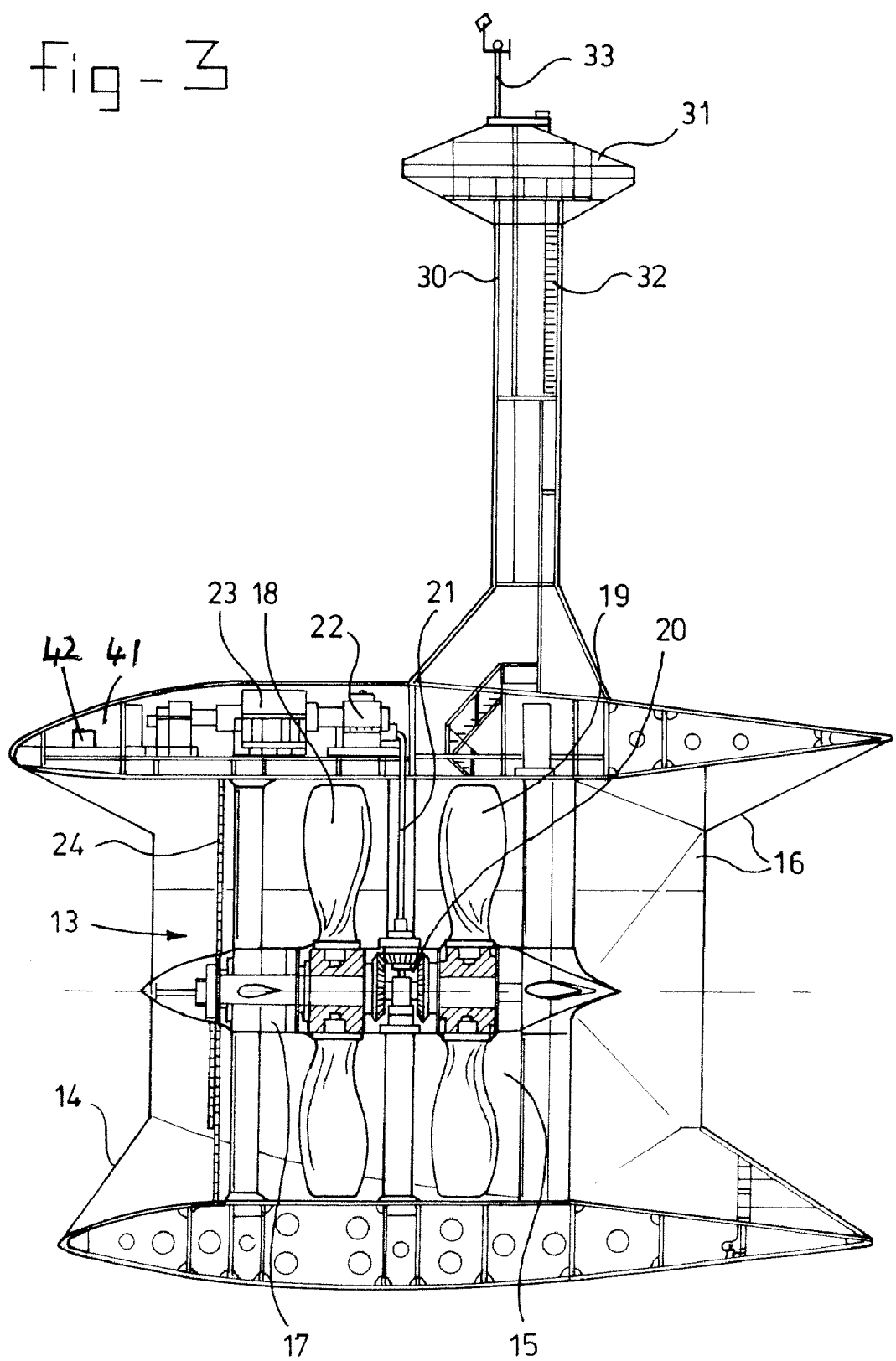

SYSTEM FOR PRODUCING HYDROGEN MAKING USE OF A STREAM OF WATER

BACKGROUND OF THE INVENTION

The invention relates to a system for producing hydrogen from water making use of a stream of water such as a gulf stream or tidal stream, comprising a number of submerged modules, each having a turbine that can be driven by the stream of water and that is coupled to a generator for generating electrical energy.

A system of this type is disclosed in U.S. Pat. No. 4,850,190.

There are no environmental problems whatsoever associated with the production of hydrogen from water and the conversion of the hydrogen produced with oxygen. There are no harmful by-products, such as carbon dioxide, carbon monoxide, sulphur dioxide or nitrogen oxide. Streams of water such as gulf streams activated by solar energy and tidal streams activated by the phase of the moon are available free and the energy from these is not subject to exhaustion.

In the installation according to U.S. Pat. No. 4,850,190 all modules are suspended from a cable system in series above one another in such a way that adverse weather conditions are not able to exert any adverse effect. The modules provided with a turbine and generator are suspended in the same direction, that is to say with their fronts facing towards the gulf stream.

SUMMARY OF THE INVENTION

This system has a number of significant disadvantages. The modules are difficult to access for maintenance and repair. The direction thereof cannot rapidly be adjusted to a change in the direction of flow of the water. The depth of each module cannot be so chosen that the turbine is driven by the fastest steam of water. The yield from the system will therefore be relatively low. In case of emergency to manoeuvre a module in a position transverse to the direction of flow is impossible. Such a case occurs for instance when the flow velocity of the water is too high.

The aim of the invention is to avoid these disadvantages and to this end the system mentioned in the preamble is characterised in that the modules are provided with means to control the depth of the modules below water level, and with means for automatically orienting the front of the modules—viewed in the longitudinal direction of the turbines—to the direction of flow of the water or an angular position deviating therefrom.

Preferably, the means to enable the depth of the modules below water level to be adjusted to the depth where the flow of the water is the most advantageous consist of ballast tanks and at least one rudder blade that can be hinged about a horizontal axis and the modules are attached by their fronts, via at least two sloping or horizontal cables, to an anchor connected to the sea bed.

In order to adjust the angular position with respect to the flow direction, a rudder blade hingeable about a vertical axis, can be used.

In order appreciably to increase the energy efficiency of the modules, the turbine of each module can be housed in a venturi-tube-shaped continuous flow channel having—viewed in the direction of flow—a channel which gradually narrows, an adjoining narrowed channel and an adjoining channel which gradually widens.

The decomposition means are preferably accommodated in the modules.

An access tower, which has a top section protruding above water level, is mounted on the top of each module.

To prevent the turbine being damaged by large fish and sea mammals, a grating is fitted on the front of the turbine of each module. Said grating can easily be cleaned to remove shell and algae growth if one or more brushes that can be moved on an arm are added to the grating.

The generator for each module could be arranged in line with the turbine. However, this is disadvantageous for the venturi effect described above. Therefore the generator of each module will be positioned a radial distance away from the turbine, the rotary movement of the turbines being transmitted via one or more gear transmissions and a rotary rod to the shaft of the generator.

To save weight and prevent deformation, the turbine blades can be of hollow construction.

Preferably, each turbine has two sets of blades which can be made to rotate in opposing directions by the stream of water.

In order to be able to achieve the venturi effect and at the same time to provide sufficient space for ballast tanks and the like, the housing of the modules can be of double-walled construction, the areas between the double walls being divided into chambers by transverse partitions and longitudinal partitions. As a consequence of the use of the ballast tanks, the modules can also be made floatable.

At least some of the chambers can be in communication with one another via openings in the partitions. The system has a central storage tower anchored on the seabed and a jetty and means for transferring hydrogen stored in tanks to the shore or a tanker.

The central storage tower is in communication, via a hydrogen transport line, with a hydrogen transport line that extends from each module, the point at which the two lines are joined being located on anchors to which the modules are connected via cables.

The invention also relates to a module that is suitable for the above-mentioned system.

BRIEF DESCRIPTION OF THE DRAWINGS

The invention will now be explained in more detail with reference to the figures, in which an illustrative embodiment is shown.

FIG. 3 shows a longitudinal section of the module.

DETAILED DESCRIPTION OF EMBODIMENTS OF THE INVENTION

Figure 1:
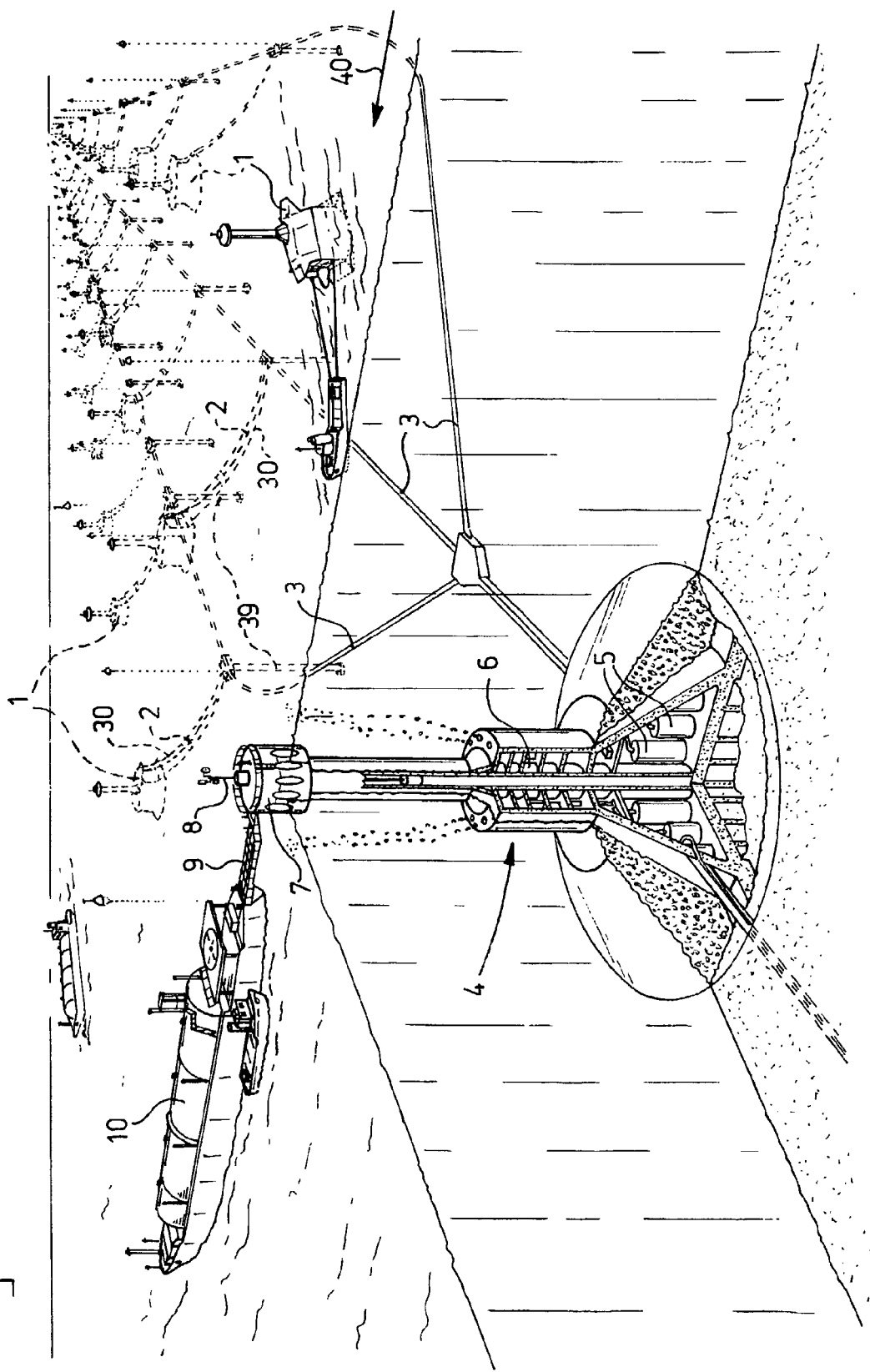
FIG. 1 shows a partially exposed, perspective view of the system.

The system shown for the production of hydrogen comprises a large number of modules 1 which are connected via lines 2, 3 to a central storage tower 4. The storage tower has tanks 5 to accommodate the hydrogen produced under relatively high pressure, for example up to 30 bar, as well as areas 6 that can serve as storage and office areas. A storage tower is anchored on the seabed.

A platform 7 with light beacon 8 is mounted on top of the storage tower. A jetty 9 where a tanker 10 or other ship can moor adjoins the platform 7.

Each module 1 has a double-walled housing with inside walls 11 and outside walls 12. The housing encircles a flow channel 13 that is in the form of a venturi, that is to say—viewed from front to back—a section 14 that becomes narrower from the outside towards the inside and merges into a narrow section 15, which in turn merges into a section 16 that widens from the inside towards the outside. A turbine 17 is mounted in the flow channel 13, which turbine 17 has two sets 18 and 19 of blades on a common axis which are driven by the stream of water through the channel 13, as a result of which their shafts are made to rotate. To save weight, blades can be of hollow construction. The shafts of the sets of blades are connected via a gear transmission 20 to a rotary rod 21. The blades of the sets 18, 19 are so oriented that their shafts are driven by the stream of water in opposing directions. The gear transmission 20 transmits the rotary movement of the shafts of both sets of blades to the rotary rod 21 in such a way that the latter rotates in one direction. A generator 22, which generates electrical energy, is made to rotate via a transmission at the other end of the rotary rod 21. The electrical energy generated is used in a decomposition apparatus 23, which has an anode and a cathode, to decompose water into hydrogen and oxygen. A high hydrogen pressure, for example up to 30 bar, can be achieved if the reaction $2H_2O \rightarrow 2H_2+O_2$ is carried out in water inside the decomposition apparatus to which KOH has been added. The decomposition apparatus 22 operates batchwise.

The hydrogen produced is stored under the pressure produced in pressure vessels, which are not shown and which are located in one or more chambers of the double wall of the housing 11, 12. A grating 24 that prevents large sea mammals, such as sharks or whales, from being able to damage the turbine is fitted on the front of the housing. A brush 26 mounted on a rotary arm enables shells and algae to be removed from the grating.

The double-walled housing is divided into chambers by transverse partitions 27 and longitudinal partitions 28. Some chambers serve as ballast tanks, one of which is referenced 41, by means of which the buoyancy of the module can be controlled. There are one or more pumps 42 on board to supply and discharge the ballast water. Other chambers are in communication with one another via holes 29.

An access tower 30 with a wide entry and exit section 31 for maintenance personnel is mounted on each module 1. A stairway 32 extends through the length of the tower, as does an air pipe 33.

A rudder blade 35 that can be turned about a horizontal axis and a rudder blade 36 that can be turned about a vertical axis are mounted at the rear of each module 1. At the front, each module is connected by two sloping or horizontal cables 37, 38 to the top of an anchor post 39 anchored on the seabed.

The hydrogen line 2 from each module runs to the top of the anchor post 39 concerned, where it is connected to a line 3 which leads to the central storage tower 4.

Figure 2:
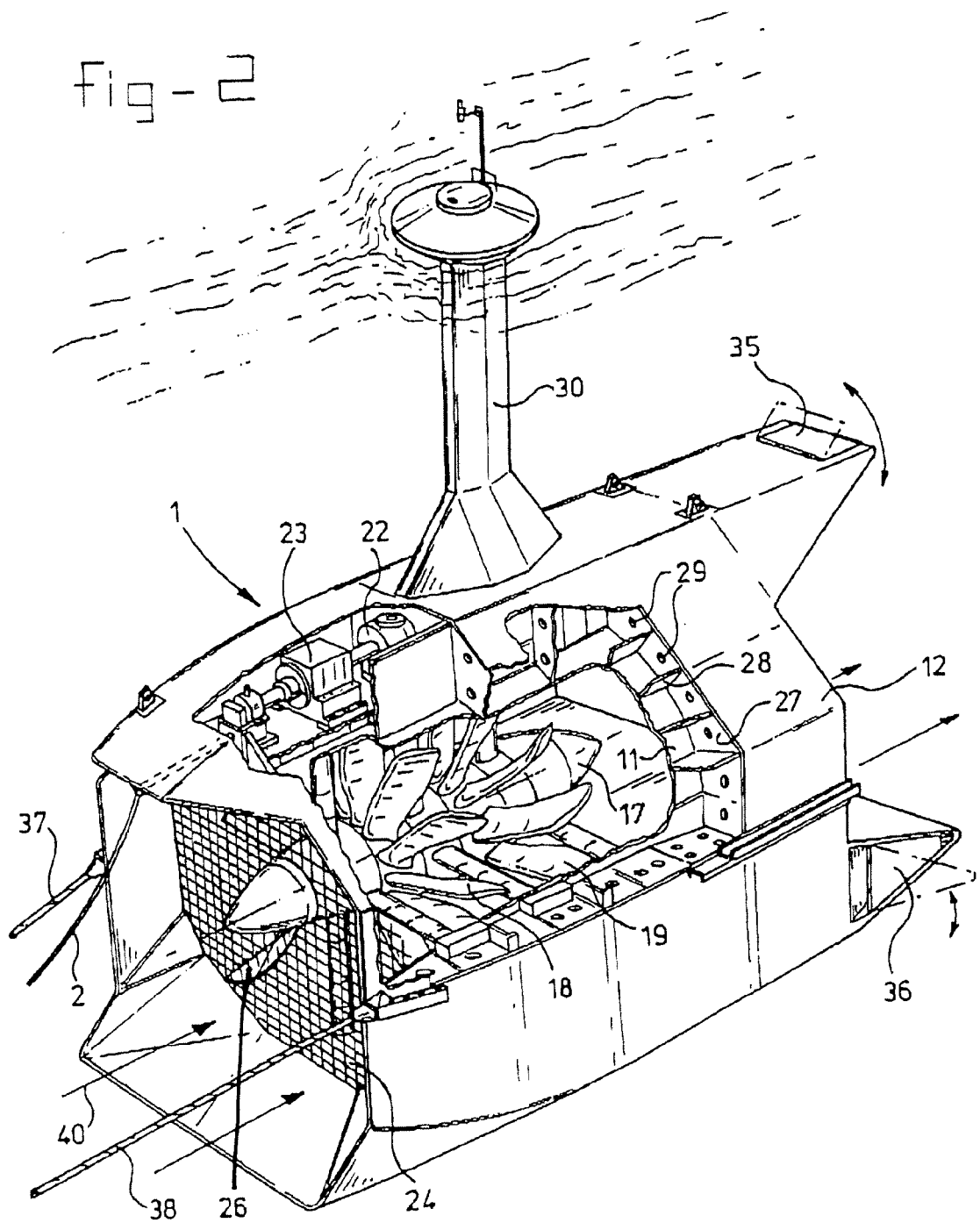
FIG. 2 shows a partially exposed, perspective view of a module employed.

The vertical positioning of each module at the most favourable water depth is effected by means of said ballast tanks and the rudder blade 35 that ran be turned about a horizontal axis. Positioning of each module 1 such that the front thereof is oriented such that it directly faces the direction of flow (indicated by 40 in FIG. 2) takes place essentially automatically in that the two cables 37, 38 are pivotably connected to the top section of the anchor post 39. The water flowing through the venturi-shaped flow channel brings the module into the most advantageous direction with respect to the gulf stream or tidal stream. This means that, in the case of a tidal stream, when the tides change the modules turn through approximately 180° with respect to the anchor post 39 to which they are connected by the two cables 37, 38.

By removing water from the ballast chamber 41, a module can be towed as a vessel (see FIG. 1). The module can be placed on the bottom by filling the ballast chambers, eventually supported by the rudder blade 36.

The oxygen produced can be released into the air, either from each module or from the central storage tower. Another possibility is to store the oxygen in vessels and to market this.

The rudder blade 36 that can be remote controlled and can be turned about a vertical axis serves to enable the position of the module with respect to the stream of water to be changed and to enable corrections to be made to the angular position of the module in the horizontal plane. If for instance the flow velocity of the water is rising to such a high value that there is a risk for damaging the sets of blades 18, 19 or the bearing thereof, the modules are maneuvered in a direction transverse to the waterflow so that the sets of blades will not be driven. It can also be that the sets of blades 18, 19 are adjustable and that—in case of a too high water flow—the sets of blades are brought in such an angular position that they are not driven. The adjustment of the blade angular takes place by remote control.

The invention claimed is:

1. A system for producing hydrogen from a stream of water flowing over a stream bed, the stream optionally being a gulf stream or a tidal stream, wherein the system comprises:
   (a) at least one hydrogen-generating submergible module having a front and a rear and being disposable in the stream of water for the water to flow from the front to the rear, the or each submergible module comprising:
      (i) a turbine drivable by the stream of water:
      (ii) an electricity generator coupled with the turbine to generate electricity when the turbine is driven;
      (iii) a water decomposition apparatus to decompose water into hydrogen using electricity generated by the electricity generator, the water decomposition apparatus being accommodated in the submergible module; and
      (iv) a depth control subsystem to adjust the depth of the submergible module in the water stream, the depth control subsystem comprising at least one ballast tank and one or more pumps to supply ballast water to, and discharge ballast water from, the at least one ballast tank.

2. A system according to claim 1 wherein the submergible module comprises a housing housing the turbine and wherein the depth control subsystem comprises at least one rudder blade mounted on the housing and hingeable about a horizontal axis.

3. A system according to claim 2 wherein the or each submergible module comprises an orientation subsystem to automatically orient the front of the module to face into the direction of flow of the water or to controllably face at an angular position deviating from the direction of flow of the water.

4. A system according to claim 3 comprising an access tower mounted on the top of the or each submergible module to provide personnel access to the interior of the module.

5. A system according to claim 4 wherein, in the or each submergible module, the electricity generator has a generator shaft and the electricity generator is radially offset from the turbine and wherein the or each submergible module comprises a gear transmission and a rotary rod to transmit rotary movement of the turbine to the generator shaft.

6. A system according to claim 5 comprising a module anchor anchored to the bed of the stream of water and wherein the or each submergible module comprises at least two sloping or horizontal cables attachable between the front of the or each submergible module and the module anchor to secure the or each submergible module.

7. A system according to claim 6 comprising multiple said submergible modules, and multiple said module anchors, each submergible module being attachable to a respective module anchor, the system further comprising a local hydrogen transport line extending from each submergible module, a hydrogen storage tower anchored on the stream bed and a central hydrogen transport line in communication with the hydrogen storage tower wherein the local and central hydrogen transport lines are joined at respective ones of the module anchors.

8. A system according to claim 5 wherein the or each submergible module comprises a venturi-tube-shaped continuous flow channel housing the respective turbine, the continuous flow channel having, in sequence from the front to the rear of the submergible module, a narrowing channel section, a narrow channel section and a widening channel section, the narrowing channel section merging into the narrow channel section and the narrow channel section merging into the widening channel section.

9. A system according to claim 4 wherein the access tower comprises a top section to protrude above water level and, optionally, comprises a stairway extending through the length of the tower.

10. A system according to claim 3, wherein, in the or each submergible module, the orientation subsystem comprises a rudder blade hingeable about a vertical axis.

11. A system according to claim 1 wherein the or each submergible module comprises a grating disposed in front of the turbine of each submergible module.

12. A system according to claim 11 wherein the or each submergible module comprises a movable arm and one or more brushes mounted on the movable arm to clean the grating.

13. A system according to claim 1 wherein, in the or each submergible module, the turbine comprises turbine blades of hollow construction.

14. A system according to claim 1 wherein, in the or each submergible module, the turbine comprises two sets of blades, the two sets of blades being rotatable by the stream of water in opposing directions about a common axis.

15. A system according to claim 1 wherein the or each submergible module comprises a housing of double-walled construction having transverse partitions and longitudinal partitions and wherein the volumes between the double walls of the housing are divided into chambers by the transverse partitions and the longitudinal partitions.

16. A system according to claim 15 wherein the transverse and the longitudinal partitions comprise openings and the chambers between the double walls comprise chambers communicating, one with another, via the openings in the partitions.

17. A system according to claim 1 comprising a hydrogen storage tower anchored on the stream bed, the storage tower comprising tanks to receive hydrogen from the at least one submergible module, a jetty, and means for transferring hydrogen stored in the tanks to a ship moored at the jetty or to shore.

18. A system according to claim 17 comprising hydrogen transport lines for transporting hydrogen between the or each submergible module and the hydrogen storage tower.

19. A system according to claim 1 wherein the decomposition apparatus comprises an anode and a cathode.

20. A hydrogen-generating submergible module for use in a system for producing hydrogen from a stream of water flowing over a stream bed, the stream optionally being a gulf stream or a tidal stream, the submergible module having a front and a rear and being disposable in the stream of water for the water to flow from the front to the rear, the submergible module comprising:
(a) a turbine drivable by the stream of water:
(b) an electricity generator coupled with the turbine to generate electricity when the turbine is driven;
(c) a water decomposition apparatus to decompose water into hydrogen using electricity generated by the electricity generator, the decomposition apparatus being accommodated in the submergible module; and
(c) a depth control subsystem to adjust the depth of the submergible module in the water stream, the depth control subsystem comprising at least one ballast tank and one or more pumps to supply ballast water to, and discharge ballast water from, the at least one ballast tank.

21. A submergible module according to claim 20 wherein the electricity generator has a generator shaft and the electricity generator is radially displaced from the turbine, wherein the turbine comprises two sets of blades, the two sets of blades being rotatable by the stream of water in opposing directions about a common axis, and wherein the submergible module comprises:
a housing housing the turbine;
an orientation subsystem to automatically orient the front of the module to face into the direction of flow of the water or to controllably face at an angular position deviating from the direction of flow of the water, the orientation subsystem comprising a rudder blade hingeable about a vertical axis;
an access tower mounted on the top of each submergible module to provide personnel access to the interior of the module;
a gear transmission and a rotary rod to transmit rotary movement of the turbine to the generator shaft; and
at least two sloping or horizontal cables attachable between the front of the submergible module and a module anchor to secure the submergible module; and the depth control subsystem comprises at least one rudder blade mounted on the housing and hingeable about a horizontal axis.

* * * * *